United States Patent [19]
Tyckowski et al.

[11] Patent Number: 6,154,149
[45] Date of Patent: Nov. 28, 2000

[54] OBJECT DETECTION BY PATTERN RECOGNITION

[75] Inventors: Joseph Tyckowski, Clawson; Christos Kyrtsos, Southfield, both of Mich.; Timothy Davies, Hermitage; Charles Hopson, Lebanon, both of Tenn.; Francois Breynaert, Caen; Pascal Bonduel, Bouzy la Foret, both of France

[73] Assignee: Meritor Light Vehicle Systems, Inc., Troy, Mich.

[21] Appl. No.: 09/391,256

[22] Filed: Sep. 7, 1999

(Under 37 CFR 1.47)

[51] Int. Cl.$^7$ ....................................................... G08G 1/16
[52] U.S. Cl. .......................... 340/903; 340/901; 340/933; 340/937; 318/480
[58] Field of Search ...................... 340/903, 435, 340/436, 437, 902, 904, 933, 937, 461, 901, 932.2, 426; 180/271; 701/45, 47; 348/135, 161, 148; 382/181, 103; 318/480; 49/26, 28

[56] References Cited

U.S. PATENT DOCUMENTS

| | | | |
|---|---|---|---|
| 5,027,104 | 6/1991 | Reid | 340/541 |
| 5,069,000 | 12/1991 | Zucherman | 49/28 |
| 5,315,285 | 5/1994 | Nykerk | 340/426 |
| 5,430,431 | 7/1995 | Nelson | 340/434 |
| 5,463,384 | 10/1995 | Juds | 340/903 |
| 5,574,443 | 11/1996 | Hsieh | 340/901 |
| 5,631,639 | 5/1997 | Hibino et al. | 340/903 |
| 5,670,935 | 9/1997 | Schofield et al. | 340/461 |
| 5,680,123 | 10/1997 | Lee | 340/937 |
| 5,699,057 | 12/1997 | Ikeda et al. | 340/937 |
| 5,734,336 | 3/1998 | Smithline | 340/903 |
| 5,786,772 | 7/1998 | Schofield et al. | 340/903 |
| 5,798,727 | 8/1998 | Shirai et al. | 342/70 |
| 5,949,331 | 9/1999 | Schofield et al. | 340/461 |
| 5,955,854 | 5/1995 | Zhang et al. | 318/480 |
| 5,959,555 | 8/1997 | Furuta | 340/937 |
| 6,002,228 | 2/1997 | Knab | 318/469 |
| 6,025,872 | 2/2000 | Ozaki et al. | 348/43 |

*Primary Examiner*—Jeffery A. Hofsass
*Assistant Examiner*—Phung Nguyen
*Attorney, Agent, or Firm*—Carlson, Gaskey & Olds

[57] ABSTRACT

An object detection system includes a sensor in communication with a controller to identify an object within a field of view. Pattern recognition algorithms are incorporated into the controller, and particular objects are predefined to minimize false detection and sift predefined objects such as vehicles from background clutter. Upon recognition of the object, an indicator in communication with the controller provides an alert to the operator who can then take corrective action. By defining another field of view the controller halts or reverses the movement of a power window to prevent trapping an object between the closing window and the window frame. Yet another field of view includes a vehicle entry point such as a vehicle door. Movement of the vehicle door will be identified by the controller and will provide an alert such as activation of the vehicle alarm system.

20 Claims, 3 Drawing Sheets

OBJECT DETECTION BY PATTERN RECOGNITION

BACKGROUND OF THE INVENTION

The present invention relates to an object detection system, and more particularly to a multifunction system for a vehicle to detect objects by pattern recognition.

Various types of collision avoidance systems for vehicles have been proposed in the past which use various technologies. Some of these systems, while quite effective in operation, are prohibitively expensive which render them unsuitable for use on a widespread basis. Others suffer from operating deficiencies, including providing false detection or the failure to properly detect an object.

The problems mentioned above are aggravated by the diverse types of environmental conditions and terrain under which vehicles are normally operated. Objects or features such as highway signs, curbs and line markings on the pavement may give rise to false detection signals. Weather conditions may also impair the effective area of the object detection system to the point that it is unable to detect objects or vehicles.

Many of these systems observe only a single area and provide a single function. One area of particular interest is that normally referred to as the vehicle operator's "blind spot." In some cases, the vehicle operator is unable to detect the presence of an object or vehicle in the blind spot, either due to his line of sight being physically blocked or an inability to view the area within the blind spot by means of mirrors or the like.

Another area of interest is the closure path of a power window. The proliferation of one-touch-up power window mechanisms have increased the possibility that an object could be captured in the closing window. Yet another area of interest is the vehicle entry points. Monitoring of these entry points provides further security for an unattended vehicle. Object detection systems have not yet been used to address these areas.

Accordingly, it is desirable to provide a multifunctional object detection system that can observe areas of interest, identify and distinguish particular objects of concern within these areas, and alert an operator of their presence.

SUMMARY OF THE INVENTION

The multifunction object detection system of the present invention generally includes a sensor and a controller which identifies an object within the sensors field of view. The sensor is preferably a camera system in communication with a controller that operates and monitors the sensor. The sensor is preferably attachable to an external side mirror of a vehicle to cover multiple field of views.

By incorporating pattern recognition algorithms into the controller, particular objects can be predefined to minimize false detection signals. The controller can then sift predefined objects such as vehicles from background clutter by comparing the observed object with the list of predefined objects. Upon recognition of the object, an indicator in communication with the controller provides an alert to the operator who can then take corrective action.

Another function provided by the sensor and controller is a safety function for a power window assembly. The sensor is similarly mounted within an external side view mirror. However, another field of view is defined as including a closure path of the window. If an object enters the closure path while the window is closing the sensor will recognize the object. In response, the controller halts or reverses the movement of the window to prevent trapping the object between the closing window and the window frame.

Yet another function provided by the sensor and controller is a security function to monitor vehicle entry points. Another field of view includes a vehicle entry point such as a vehicle door. By having the sensor mounted to the vehicle mirror any movement of the vehicle door will change the background within the field of view. Any change in background identified by the controller will indicate movement of the vehicle door and provide an alert such as activation of the vehicle alarm system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
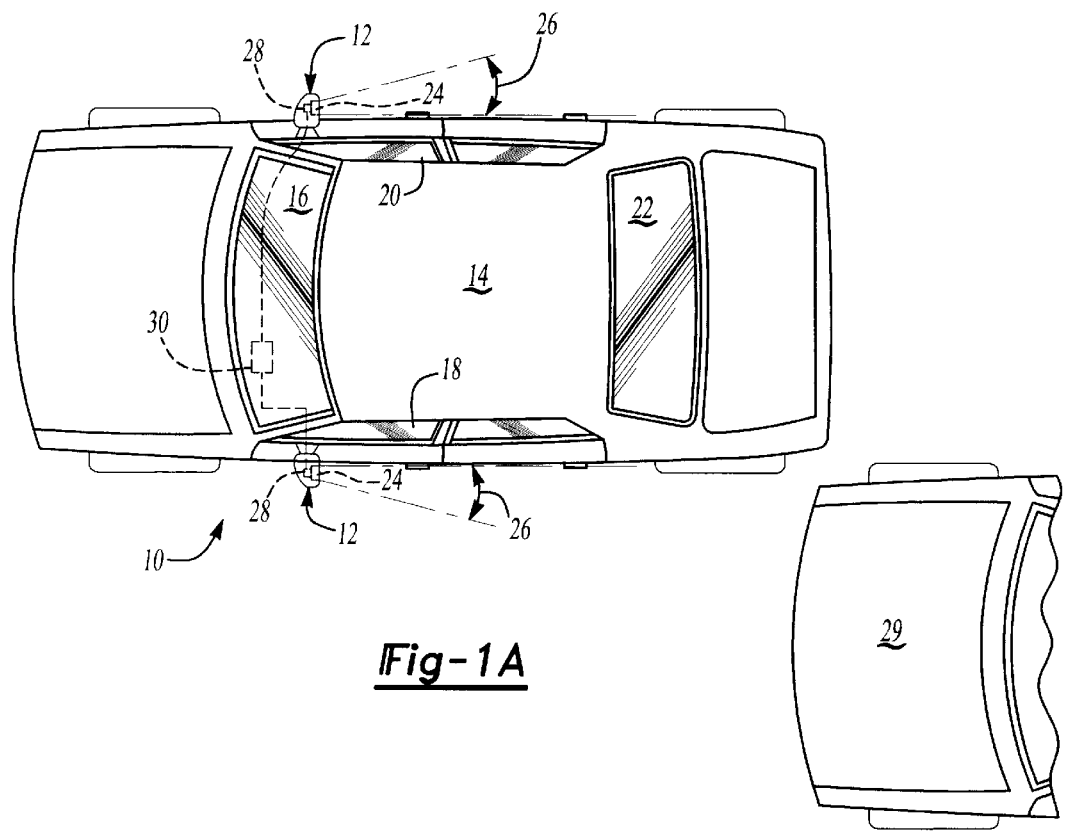
FIG. 1A is a top plan view of a vehicle having an object detection system according to the present invention.

FIG. 1 illustrates an object detection system 10 according to the present invention. The system 10 is preferably attachable or integral to an external side view mirror 12 of a vehicle 14. The vehicle 14 having a front window 16, a drivers side window 18 a passenger side window 20 and a rear window 22. The system 10 includes a sensor 24 mounted to have a defined field of view 26. As will be further described below, by redefining the field of view 26, the system 10 can provide multiple functions.

The sensor 24 is preferably a camera system in each external side view mirror 12 in communication with a controller (shown schematically at 28). The controller 28 operates and monitors the sensor 24 such that the controller 28 can recognize an object (shown schematically at 29) within the field of view 26. The controller 28 incorporates pattern recognition algorithms to recognize the object 29. A single controller may also be used rather than separate controllers. Pattern recognition algorithms can be provided by signal processing circuitry well known in the art of processing signals and further description of these algorithms will not be discussed. Additionally, although various types of sensors 24 are compatible with pattern recognition algorithms, the specific objects which are to be detected and the expected environmental conditions provides the determination of whether, optical, infrared, thermal, radar, or another type of sensor 24 is to be preferred.

By incorporating pattern recognition algorithms into the controller 28, particular objects such as vehicles can be predefined to minimize false detection signals. The controller 28 can then sift the predefined objects from background clutter by comparing the observed object with the list of predefined objects. Accordingly, by combining pattern recognition with an appropriate sensor 24, the effect of weather conditions and highway or background objects can be substantially reduced.

Upon recognition of the object 29, an indicator 30 in communication with the controller provides an alert to the operator. The alert can be visual or audio and may be located within the vehicle passenger compartment or mounted adjacent the mirror itself.

Figure 1B:
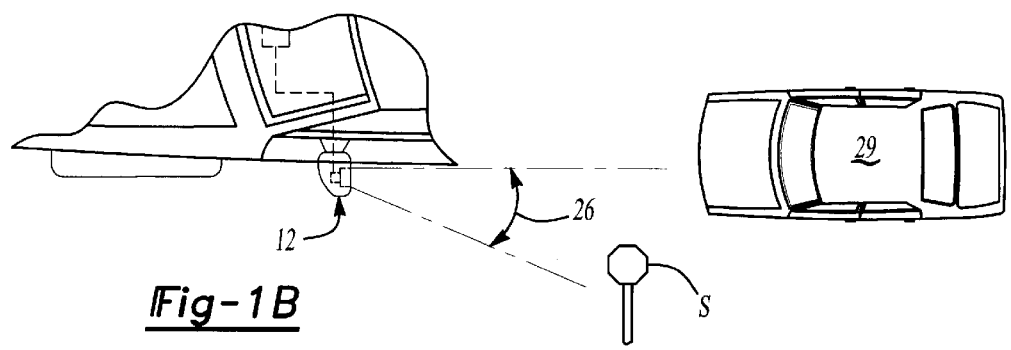
FIG. 1B shows the view during the function of FIG. 1A.

As shown in FIG. 1B, the controller, using properly programmed objects can distinguish between a vehicle 29 and objects such as road signs S which prior art systems might identify as a vehicle in the blind spot. Known object recognition systems are capable of quickly making these distinctions.

Figure 2A:
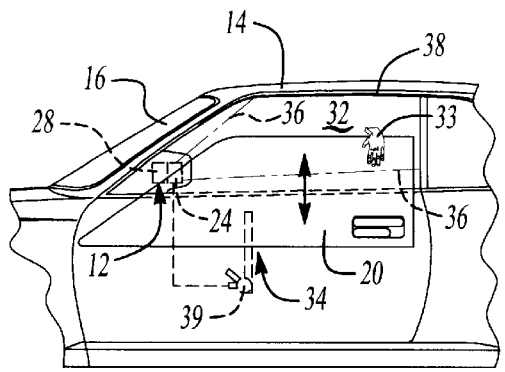
FIG. 2A is a partial side view of the vehicle of FIG. 1A showing the power window protection function according to the present invention.

As shown in FIG. 2A, another function provided by the sensor 24 and controller 28 is a safety function for a power window assembly 34 having a movable closure member such as the vehicle side window 20.

The sensor 28 is similarly mounted within an external side view mirror 12 as described above. However, another field of view 36 is defined as including a closure path 32 of the window 20. Accordingly, by defining the field of view 36 as the closure path 32, the controller can recognize whether any object 33 is within the closure path 32. Pattern recognition is again preferably incorporated in the controller 28. However, as any object 33 within the closure path 32 is undesirable, the controller would not have to compare the object 33 to the list of predefined objects as previously described.

In use, the controller 28, in response to the sensor 24, halts or reverses the movement of the window 20 to prevent trapping the object 33 between the window 20 and a window frame 38. To achieve this control, the controller 28 communicates with a power window motor (shown schematically at 39) attached to the window 20. Additionally, the sensor 24 can be maintained in a dormant state and operated only when the window 20 is being closed.

Figure 2B:
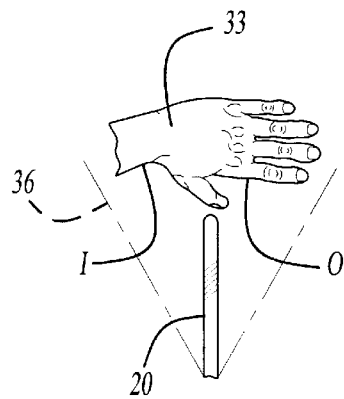
FIG. 2B is another view of the function performed by FIG. 2A.

As shown in FIG. 2B, the field of view could be set to include both inside and outside the plane of the window. Any object 33 that is "seen" both inside and outside the window, and in the path, is an undesirable obstruction. Thus, if sensor 24 senses points I and O, then an obstruction can be indicated.

Figure 3:
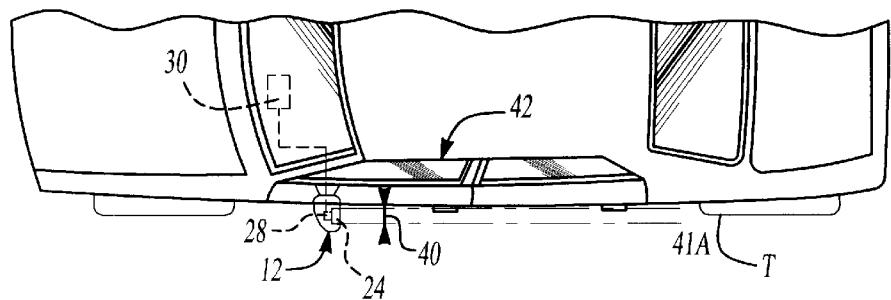
FIG. 3 is a top plan view of the vehicle of FIG. 1A showing the security function according to the present invention.

As shown in FIG. 3, another function provided by the sensor 24 and controller 28 is a security function to monitor vehicle entry points. Another field of view 40 includes a vehicle entry point such as a vehicle door 42. Accordingly, by defining the field of view 40 to include the vehicle door 42, the controller 28 can recognize whether the vehicle door 42 is being opened.

Figure 4A:
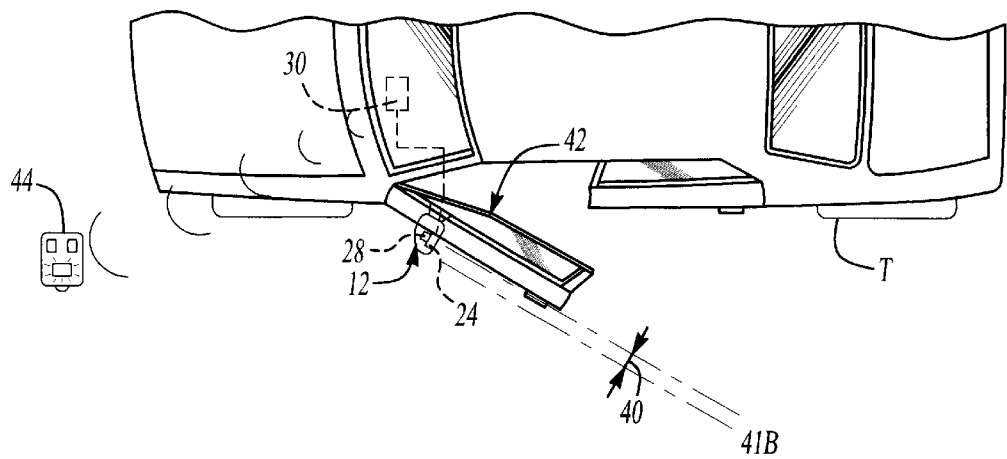
FIG. 4A is a top plan view of the vehicle of FIG. 1A showing the security function of FIG. 3 in an activated position.

Typically, vehicle side view mirrors 12 are mounted to the vehicle doors 42. By having the sensor 24 mounted to the vehicle mirror 12 any movement of the vehicle door 42 will change the background 41a within the field of view 40. As an example, the field of view in this mode could include tire T. The change in background 41b (FIG. 4A) identified by the controller 28 will indicate movement of the vehicle door 42. Tire T is not longer in view, and this can be easily identified. If the controller 28 determines that the vehicle door 42 is being opened, the indicator 30 preferably provides an alert such as activation of the vehicle alarm system (not shown). Alternatively, the indicator 30 can remotely notify the vehicle's owner by transmitting an alert to a key fob (shown schematically at 44) which may also be used to activate and deactivate the security function. Although a key fob or vehicle alarm is described, the indicator could similarly remotely alert a mobile phone, pager, security service, or the like.

Figure 4B:
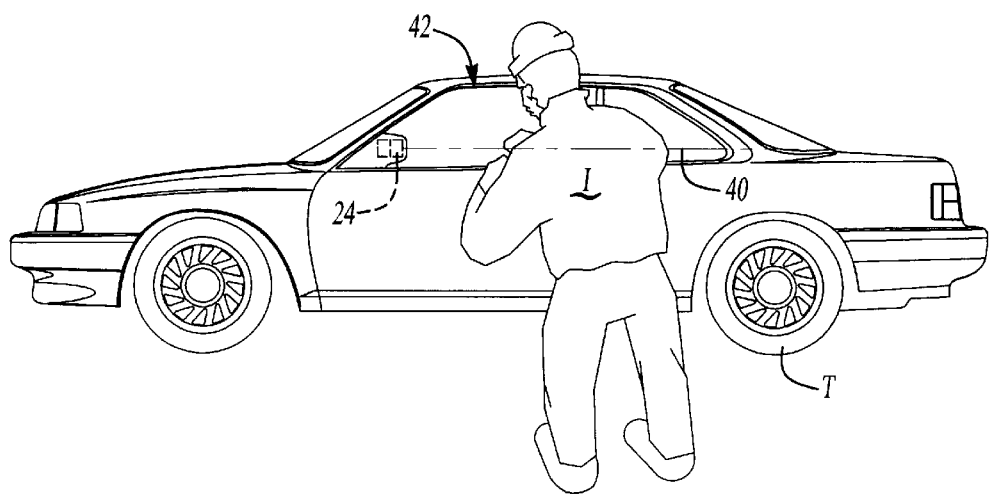
FIG. 4B shows another security function.

FIG. 4B shows the field of view 40 including tire T. If an intruder I approaches the door, the field of view again changes and an alarm may be sent.

Controller 28 may also be operable to change the field of view of camera 24 dependent on the necessary function. As an example, when the vehicle is moving, the "blind spot" field of view may be set. When the windows are moving, the "obstruction" field of view may be set. When the vehicle is parked, the "security" field of view is set. Cameras with the ability to set multiple fields of view are well within the skill of the camera art.

Also, the detection system may be used solely for any of the above functions. Further, the object detection or security functions can be achieved with other types of sensors than the specifically disclosed camera. Merely detecting the inside/outside indicates an obstruction, and this may be detectable by other types of sensors. The same is true of the vehicle security function.

The present invention therefore provides an object detection system which can perform multiple functions. By integrating multiple functions within one system the overall cost to manufacture and produce is reduced.

The foregoing description is exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An object detection system for a vehicle comprising:
   a sensor mounted to have a defined field of view;
   a controller in communication with said sensor, said controller operable to recognize a predefined object within said field of view, said predefined object recognizable by said controller by comparing an observed object with said predefined object; and
   an indicator in communication with said controller, said indicator providing an alert in response to said controller recognition of said predefined object.

2. The system as recited in claim 1, wherein said sensor is attached to a vehicle side view mirror.

3. The system as recited in claim 1, wherein said sensor is a camera.

4. The system as recited in claim 1, wherein said defined field of view includes an area adjacent the vehicle.

5. The system as recited in claim 1, wherein said predefined object is a vehicle.

6. The system as recited in claim 1, wherein said field of view includes an area above a window closure path.

7. The system as recited in claim 1, wherein said field of view is used for a vehicle security function when the vehicle is parked, said controller activating said indicator in response to an image change within said field of view.

8. An object detection system for a vehicle comprising:

a sensor mounted to have a defined field of view, said defined field of view including a closure path of a moveable closure member; and a controller in communication with said sensor, said controller operable to recognize an obstruction within said closure path, said obstruction recognizable by said controller by comparing a predefined obstruction-free image of said closure path to said closure path including said obstruction.

9. The system as recited in claim 8, wherein said moveable closure member is a vehicle window.

10. The system as recited in claim 8, wherein said controller only operates to recognize the object when said closure member is being closed.

11. The system as recited in claim 8, wherein said controller reverses the direction of said moveable closure member in response to recognition of the object.

12. The system as recited in claim 8, wherein said sensor is mounted to a vehicle side view mirror.

13. The system as recited in claim 8, wherein said sensor is a camera.

14. An object detection system for a vehicle comprising:

a vehicle side view mirror;

a sensor mounted to have a defined field of view, said defined field of view including an area adjacent the vehicle and a closure path of a moveable closure member;

a controller in communication with said sensor, said controller operable to recognize a predefined object within said area adjacent the vehicle and an obstruction within said closure path; and an indicator in communication with said controller, said indicator providing an alert in response to said controller recognition of a change to said predefined object relative to said defined field of view and in response to a location of said obstruction relative to said closure path.

15. The system as recited in claim 14, wherein said moveable closure member is a vehicle window, said controller halting movement of said moveable closure member in response to recognition of the object.

16. The system as recited in claim 14, wherein said defined field of view includes a vehicle door, said controller operable to recognize movement of said vehicle door.

17. The system as recited in claim 16, wherein said indicator provides an alarm in response to said controller recognition of said vehicle door movement.

18. The system as recited in claim 16, wherein said indicator transmits an alarm to a remote location in response to said controller recognition of said vehicle door movement.

19. The system as recited in claim 14, wherein said controller is operable to change the field of view between said area adjacent the vehicle and said closure path based upon whether said moveable closure member is moving.

20. The system as recited in claim 19, wherein the sensor is a camera.

* * * * *